United States Patent
Hildebrand et al.

(10) Patent No.: US 10,263,879 B2
(45) Date of Patent: Apr. 16, 2019

(54) I/O STACK MODELING FOR PROBLEM DIAGNOSIS AND OPTIMIZATION

(71) Applicant: International Business Machines Corporation, Armonk, NY (US)

(72) Inventors: Dean Hildebrand, Bellingham, WA (US); Ramani R. Routray, San Jose, CA (US); Vasily Tarasov, Port Jefferson Station, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 683 days.

(21) Appl. No.: 14/852,690

(22) Filed: Sep. 14, 2015

(65) Prior Publication Data

US 2017/0078164 A1  Mar. 16, 2017

(51) Int. Cl.
*H04L 12/715* (2013.01)
*H04L 12/26* (2006.01)
*H04L 12/24* (2006.01)
*G06F 11/34* (2006.01)

(52) U.S. Cl.
CPC .......... *H04L 45/04* (2013.01); *G06F 11/3409* (2013.01); *G06F 11/3447* (2013.01); *H04L 41/145* (2013.01); *H04L 43/50* (2013.01)

(58) Field of Classification Search
CPC ......... H04L 43/04; H04L 43/50; H04L 45/04; H04L 41/145; G06F 11/3409; G06F 11/3447

See application file for complete search history.

(56) References Cited

U.S. PATENT DOCUMENTS

| | | | |
|---|---|---|---|
| 7,035,786 | B1 | 4/2006 | Abu El Ata et al. |
| 8,478,845 | B2 | 7/2013 | Agarwala et al. |
| 8,612,197 | B1 * | 12/2013 | Johnson ............. G06F 17/5022 703/13 |
| 8,621,051 | B2 | 12/2013 | Agarwala et al. |

(Continued)

OTHER PUBLICATIONS

J. Xie, et al., "Adaptive Query Correlation Aware Workload Execution Ordering," IP.com No. 000176156, Nov. 6, 2008, 16 pages.

(Continued)

*Primary Examiner* — Gil H. Lee
(74) *Attorney, Agent, or Firm* — Cantor Colburn LLP; Randall Bluestone

(57) ABSTRACT

An aspect includes input/output (I/O) stack modeling. A processor determines a client configuration of a client I/O stack that includes layers with configurable parameters to control storage and retrieval of data between an uppermost layer and lowest layer. A model of the client I/O stack is built on a layer basis that defines input workload characteristics, output workload characteristics, and layer configuration parameters for the layers of the model based on the client configuration. Workload characteristics of the uppermost layer of the client I/O stack are fed to the model. The processor determines a statistical distribution of workload characteristics associated with each of the layers of the client I/O stack. I/O performance results are captured for layers of the model based on feeding the workload characteristics of the uppermost layer.

15 Claims, 7 Drawing Sheets

(56) References Cited

U.S. PATENT DOCUMENTS

| | | | |
|---|---|---|---|
| 2004/0167765 A1* | 8/2004 | Abu El Ata | G06F 17/10 703/22 |
| 2006/0009159 A1* | 1/2006 | Leung | H04L 43/18 455/67.11 |
| 2007/0025261 A1* | 2/2007 | Ginsberg | H04L 43/50 370/250 |
| 2014/0173015 A1 | 6/2014 | Agarwala et al. | |

OTHER PUBLICATIONS

K. Vaid, et al., "Method for storage analysis and testing based on workload characterization data," IP.com No. 000193433, Feb. 23, 2010, 6 pages.

K. Vaid, et al., "Method for storage analysis and testing based on workload characterization data," IP.com No. 000206443, Apr. 26, 2011, 5 pages.

List of IBM Patents or Patent Applications Treated as Related, Sep. 14, 2015, 2 pages.

Peter Mel, et al., The NIST Definition of Cloud Computing, Recommendations of the National Institute of Standards and Technology, NIST U.S. Department of Commerce Special Publication 800-145, Sep. 2011, 7 pages.

T. Harter, et al., "Analysis of HDFS Under HBase: A Facebook Messages Case Study," In the proceedings of the 12th USENIX Conference on File and Storage Technologies (FAST Feb. 2014), 15 pages.

U.S. Appl. No. 14/852,706, filed Sep. 14, 2015, Entitled: "Software Defined Storage Stack Problem Diagnosis and Optimization," First Named Inventor: Dean Hildebrand.

* cited by examiner understand precisely how the requests flow and change as I/O between layers of the I/O stack. One way to understand request flow is to collect I/O traces at different layers in the I/O stack. However, tracing a system even at a single layer causes significant overhead. As a result, it may not be acceptable to trace multiple layers in a production environment when deployed in a client I/O stack. To avoid negative impacts on a production system, embodiments can trace a non-production replica of the client I/O stack and achieve the required degree of details. Creation of a precise replica of a production system can be an expensive, time consuming, and daunting task. In some cases, due to the scale of the production system and the high cost of its components, it may be economically infeasible to setup a fully dedicated replica as a test system.

I/O STACK MODELING FOR PROBLEM DIAGNOSIS AND OPTIMIZATION

BACKGROUND

The present invention relates to computer system diagnostics, and more specifically, to input/output stack modeling for problem diagnosis and optimization.

SUMMARY

According to embodiments of the present invention, a method, system, and computer program product are provided for input/output (I/O) stack modeling. A processor determines a configuration of a client I/O stack that includes a plurality of layers with configurable parameters to control storage and retrieval of data between an uppermost layer and a lowest layer. A model of the client I/O stack is built on a layer basis that defines input workload characteristics, output workload characteristics, and layer configuration parameters for the layers of the model based on the client configuration. A plurality of workload characteristics of the uppermost layer of the client I/O stack is fed to the model. The processor determines a statistical distribution of workload characteristics associated with each of the layers of the client I/O stack. I/O performance results are captured for one or more layers of the model based on feeding the workload characteristics of the uppermost layer of the client I/O stack to the model.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
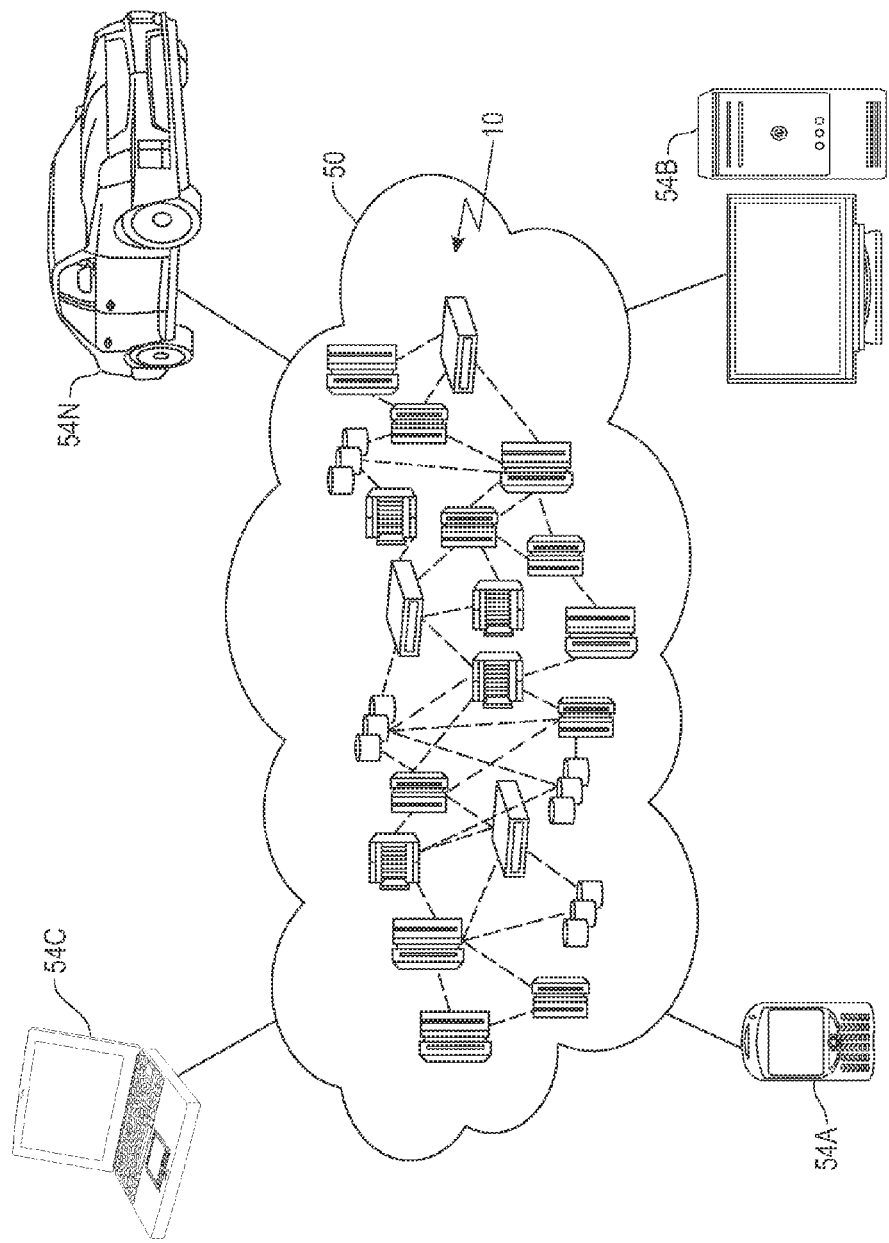
FIG. 1 depicts a cloud computing environment according to an embodiment.

Embodiments described herein are directed to I/O stack modeling for problem diagnosis and optimization. Computer storage system performance depends heavily on the input/output (I/O) workload that the system experiences. For instance, reads may be faster than writes while sequential access to media provides higher throughput than random access patterns. Depending on the working set size (i.e., memory requirements for a process in a given time interval), requests can hit the system's cache more or less frequently resulting in a significant variation in overall performance.

To simplify design and provide a high level of interoperability, modern storage systems are designed as layers of functionalities. In an operating system, an application may submit I/O requests to a virtual file system, which redirects them to a specific file system driver, such as ext4 or IBM General Parallel File System (GPFS). The file system can then use a block layer to access block devices or a network layer to request data from a remote machine, where the layers are stacked as an I/O stack (e.g., a storage stack).

When a storage system is distributed and includes one or more runtime environments along with virtual machines, the number of layers can grow quickly. Before an application request reaches its final destination, thirty layers or more may be traversed. As Software Defined Storage (SDS) and Software Defined Network (SDN) paradigms gain popularity, the majority of storage functionality moves from hardware to a software stack. This also contributes to an increase in the number of layers as well as their individual complexities.

Each application request can potentially be spliced, chopped, queued, reordered, and reissued as it passes through software and network layers to its final destination on a physical device. Some requests are absorbed by the caches of various layers, while in other cases a single application request can induce a sequence of additional requests at the lower layers.

To identify storage performance problems it is helpful to

Exemplary embodiments provide a cloud service that can build a library of common I/O stack configurations and build a library of common I/O workloads for different layers in the I/O stack. For a specific client, embodiments can automatically discover the client I/O stack configuration and collect I/O traces or I/O characteristics of the client workloads (e.g., I/O size and randomness throughout I/O stack layers for specific applications). Based on the information in the libraries, embodiments can characterize request flow in the client I/O stack and perform storage bottleneck analysis based on the multi-layer I/O characteristics collected.

Embodiments include a service (e.g., in a cloud computing environment) that can characterize request flow in a storage system by statistically modeling independent I/O layers. Modeling allows characterizing of a request flow in a very short time—from minutes to hours—and does not require costly equipment and software replication. Statistics can be gathered incrementally from existing systems and workloads and used as a training set for the model. Embodiments can populate a library of I/O configurations and multi-layer workload characteristics. Embodiments can further discover a client storage configuration and I/O workload, and/or deduce multi-layer workload characteristics based on the library of existing workloads and configurations.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
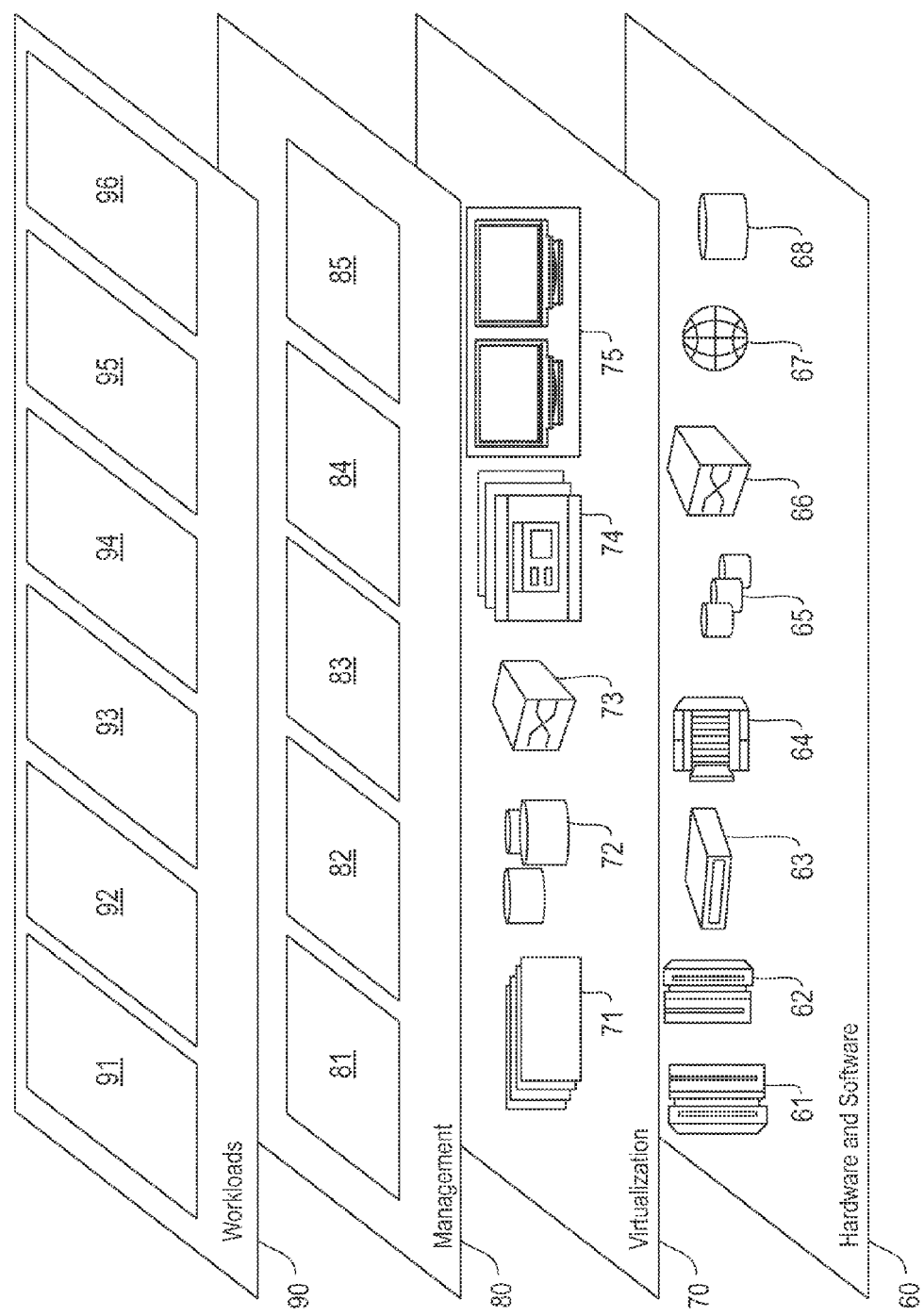
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an I/O stack modeling service 96 for diagnostic and optimization operations. Although FIG. 2 depicts workloads layer 90 above management layer 80, workloads need not send I/O requests through management layer 80 to reach virtualization layer 70. In some embodiments, management layer 80 and workloads layer 90 can both directly interact with virtualization layer 70, and workloads of workloads layer 90 can operate in conjunction with or independent of management layer 80.

Figure 3:
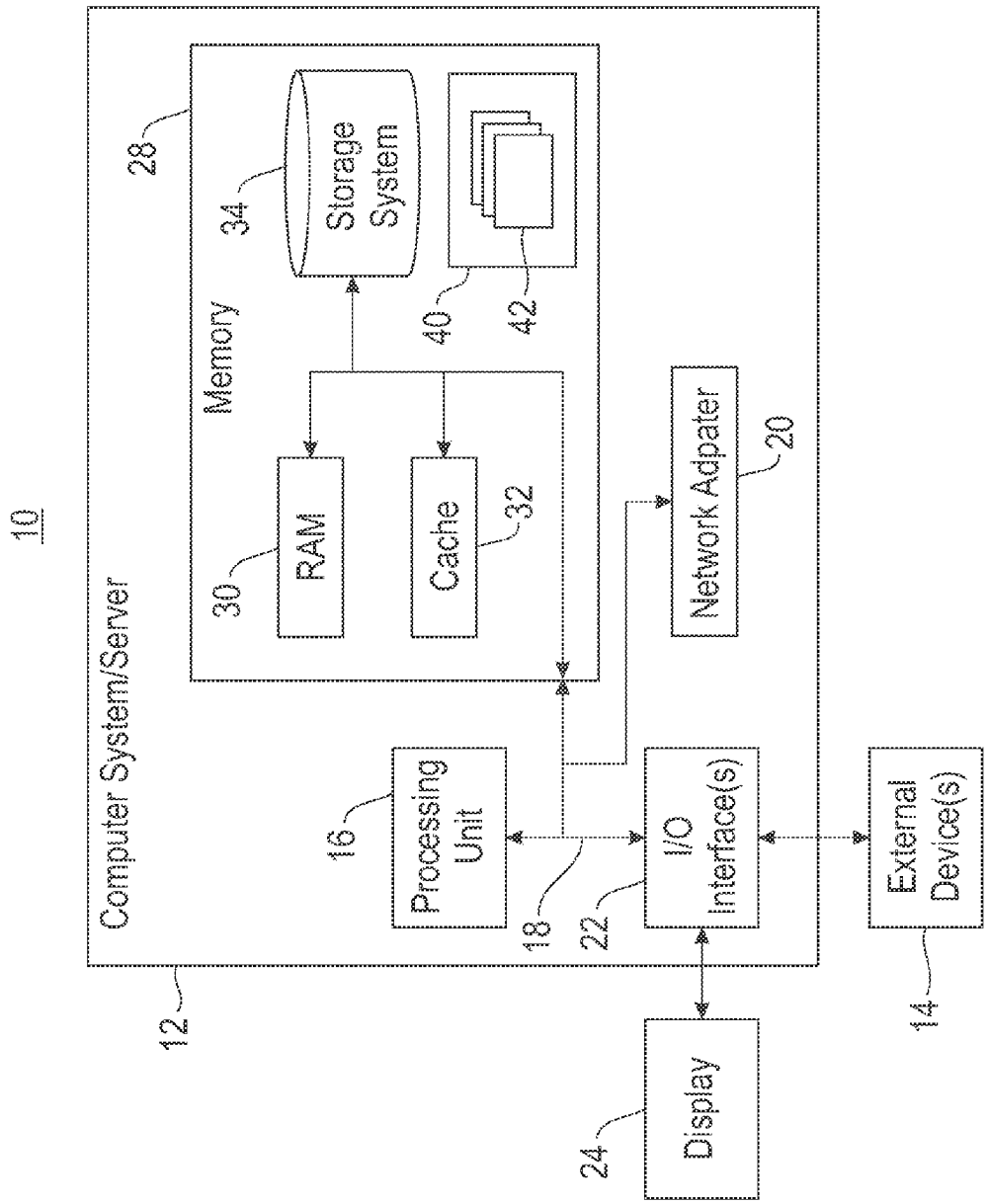
FIG. 3 depicts a block diagram of a cloud computing node according to an embodiment.

Referring now to FIG. 3, a schematic of an example of the cloud computing node 10 of FIG. 1 is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
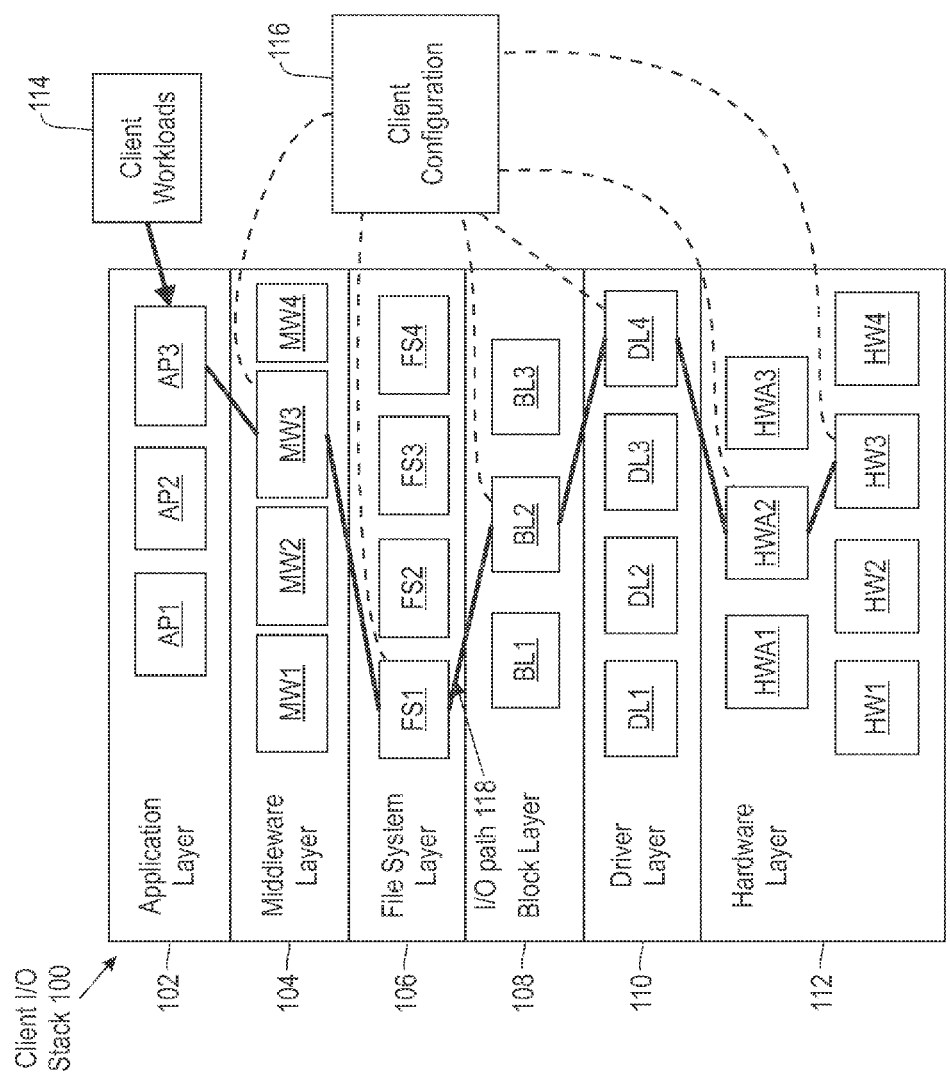
FIG. 4 depicts a block diagram of a client I/O stack that can be modeled according to an embodiment.

Referring now to FIG. 4, a block diagram of a client I/O stack 100 that can be modeled is depicted. The client I/O stack 100 can execute on a client storage system that may include multiple servers and storage systems distributed across a computer network. The example of the client I/O stack 100 of FIG. 4 includes an application layer 102, a middleware layer 104, a file system layer 106, a block layer 108, a driver layer 110, and a hardware layer 112. It is noted that this example can be extended to include additional layers to support virtual machines, where the number of layers can double by splitting similar layers between a hypervisor and virtual machine in addition to the layers depicted in the client I/O stack 100. As a further example, if a distributed file system (or distributed block devices) is used, then a network layer would appears in the client storage stack 100. Layers above and below the network layer reside on different machines and can be the same or can be different, depending on a specific client configuration. Each layer in the client I/O stack 100 may support a number of variations. In some instances, the client I/O stack 100 includes multiple variations installed with a specific combination configured to be active, while in other instances, the layers 102-112 can support other variations upon installation and configuration of one or more of the layers 102-112.

In the example of FIG. 4, there are three application options (AP1, AP2, AP3) depicted in application layer 102, four middleware options (MW1, MW2, MW3, MW4) depicted in middleware layer 104, four file system options (FS1, FS2, FS3, FS4) in file system layer 106, three block layer options (BL1, BL2, BL3) in block layer 108, four driver options (DL1, DL2, DL3, DL4) in driver layer 110, and seven hardware options (partitioned as HWA1, HWA2, HWA3 and HW1, HW2, HW3, HW4). It will be understood that the client I/O stack 100 is merely an example and any number of options can exist in each of the layers 102-112, as well as a different number of layers. Examples of applications AP1-AP3 in application layer 102 can include file editors, word processors, web servers, web browsers, and the like. Examples of middleware MW1-MW4 in middleware layer 104 can include application servers, database management systems, distributed storage/processing framework software, cloud computer operating systems, and the like. Examples of file systems FS1-FS4 in file system layer 106 can include IBM GPFS, ext4, and other open source and/or proprietary file systems. Examples of block layer options BL1-BL3 in block layer 108 can include various queue-based I/O schedulers and the like. Examples of drivers DL1-DL4 in driver layer 110 can include various host bus adapter drivers, redundant array of independent disks (RAID) drivers, and the like. Examples of hardware HWA1-HWA3 in hardware layer 112 can include host bus adapter hardware, RAID adapter hardware, and the like as higher-level adapter hardware. Examples of hardware HW1-HW4 in hardware layer 112 can include lower-level hardware, such as hard disk drives, solid-state drives, phase change memory, non-volatile memory, and the like.

In embodiments, each broad option (e.g., file system type) has a set of configuration parameters (e.g., file-system block size or "inode" size). Each combination of values for these parameters essentially creates a new option. For instance, if a client uses an Ext4 file system, there are many parameters of Ext4 to be selected, such as block size, "inode" size, and the like. Ext4 with a block size of 4 KB and "inode" size of 512 bytes is one option, while Ext4 with a block size of 8 KB and "inode" size of 256 is another option, and so on. This variable in parameter configuration combinations applies to any layer. Parameters available are specific to the broad option (e.g., Ext4 parameters are different from IBM GPFS parameters).

Client workloads 114 can be defined to run a particular application, such as AP3, which invokes I/O interactions with respect to layers 102-112. Depending on the client configuration 116, an I/O path 118 between the application layer 102 as the uppermost layer and the hardware layer 112 as the lowest layer can vary. In the example of FIG. 4, the client configuration 116 establishes I/O path 118 as AP3 to MW3 to FS1 to BL2 to DL4 to HWA2 to HW3. The client configuration 116 also establishes configurable parameters to control storage and retrieval of data between an uppermost layer (i.e., application layer 102) and a lowest layer (i.e., hardware layer 112). The configurable parameters can control values such as block size, page pool size, cache size, prefetch aggressiveness, caching watermarks, and the like. Client configuration 116 can be established and may be set/examined using a set of configuration files of the client I/O stack 100 and/or issuing one or more function calls to configuration importing/exporting functions of the client I/O stack 100. The exact contents of client workloads 114 need not be known external to the client I/O stack 100; the input/output characteristics of the client workloads 114 need only be discoverable by direct I/O tracing, collection of statistical characteristics, or other such methods.

Figure 5:
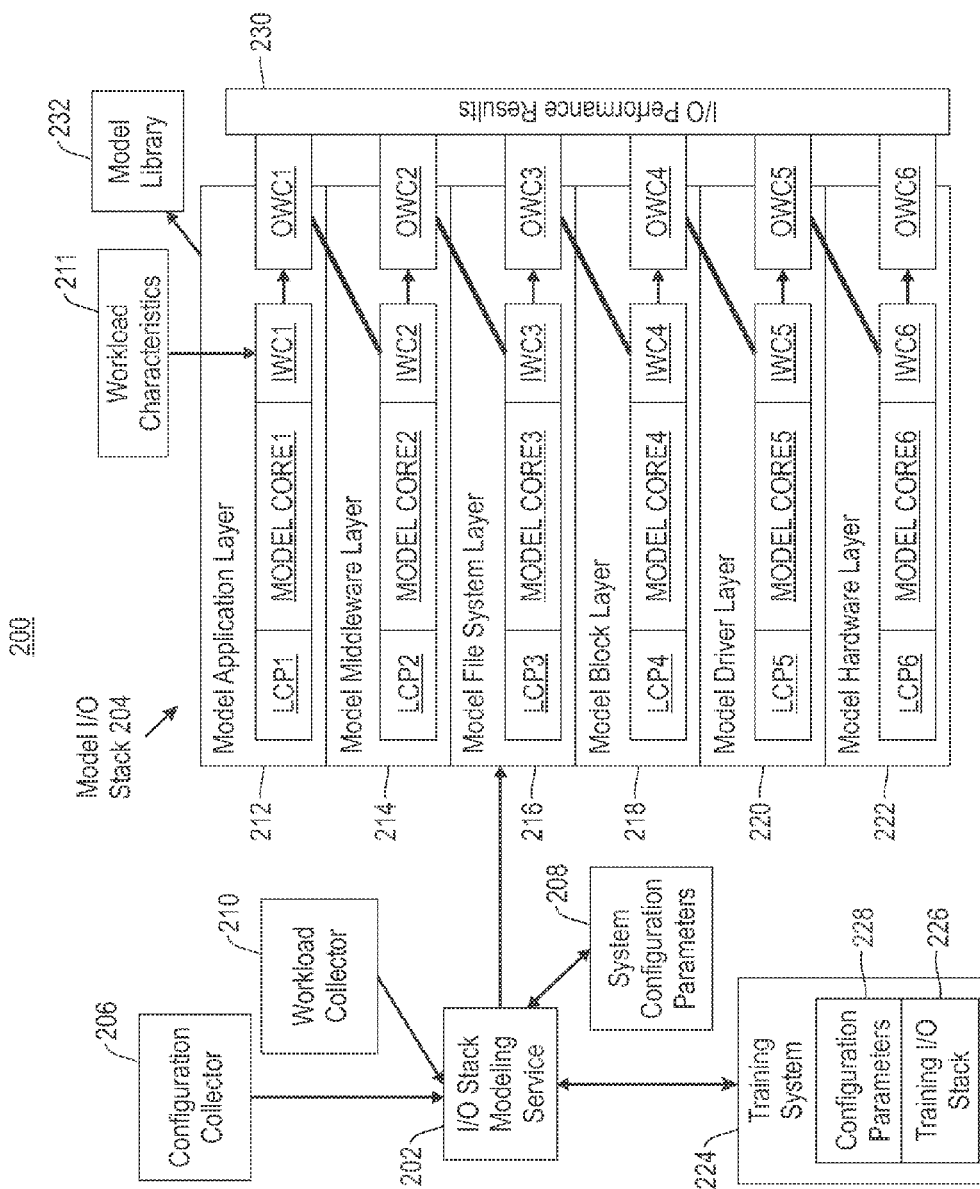
FIG. 5 depicts a block diagram of a system for client I/O stack modeling according to an embodiment.

FIG. 5 depicts a block diagram of a system 200 for I/O stack modeling according to an embodiment. An I/O stack modeling service 202 can be stored as computer readable instructions in memory and executed by a processor, such as memory 28 and processor 16 of the computer system/sever 12 of FIG. 3 as part of a cloud computing node or as cloud consumer (e.g., computers/systems 54A-54N of FIG. 1). The I/O stack modeling service 202 can be an embodiment of the I/O stack modeling service 96 of FIG. 2 or implemented in a non-cloud based networked environment. In one embodiment, upon execution of the I/O stack modeling service 202, a model I/O stack 204 is created as a model of the client I/O stack 100 of FIG. 4.

The I/O stack modeling service 202 can discover the client configuration 116 of the client I/O stack 100 through a set of configuration files or special function calls. A configuration collector 206 can run on the client system and collect required configuration files along with the values returned by configuration-exporting functions. The information collected provides substantially accurate information about the client configuration 116 to establish system configuration parameters 208 to train the model I/O stack 204. The I/O stack modeling service 202 may also use a workload collector 210 at the client system to capture I/O characteristics at the uppermost layer (i.e., application layer 102) in the client I/O stack 100 representing the client workloads 114. In embodiments, statistical characteristics of a workload can be collected (e.g., I/O size distribution, randomness, or dataset size) as workload characteristics 211 associated with the uppermost layer in the client I/O stack 100.

The I/O layers for the client I/O stack 100 may have well-defined interfaces and configuration parameters. For example, a Linux server typically has a Virtual File System layer (VFS) with a fixed number of methods exported up to a system call layer. The VFS in turn calls a fixed number of methods exported by the Linux block layer. The VFS can be configured by setting parameters such as cache size limits, metadata and data flush frequencies, and others. In some embodiments, details within each of the layers 102-112 of the client I/O stack 100 are not available for instrumentation or replication, e.g., closed source database such as Oracle, a private company caching layer, requirements for a software license or hardware access, etc. Rather than building a dedicated replica system to match the client system with a corresponding I/O stack, the I/O stack modeling service 202 builds the model I/O stack 204 to model observed behavior on a layer basis. The model I/O stack 204 can be instrumented and experimented with in the process of problem determination and/or optimization. Well-defined interfaces allow to the I/O stack modeling service 202 to characterize incoming workloads (e.g., produced by the upper layer, i.e., the application layer 102 of client I/O stack 100) and outcoming workloads (submitted to each lower layer, to middleware layer 104 of client I/O stack 100) in a generic manner, without respect to how the internals of each layer operates. As one example, ratios of operations (e.g., reads, writes, creates, etc.) and various I/O size distributions can be computed for the file system layer 106 of client I/O stack 100 regardless of which file system (FS1-FS4) is deployed in the I/O path 118.

Accordingly, application layer 102 of client I/O stack 100 is modeled as model application layer 212 in model I/O stack 204. Middleware layer 104 of client I/O layer 100 is modeled as model middleware layer 214 in model I/O stack 204. Files system layer 106 of client I/O layer 100 is modeled as model file system layer 216 in model I/O stack 204. Block layer 108 of client I/O layer 100 is modeled as model block layer 218 in model I/O stack 204. Driver layer 110 of client I/O layer 100 is modeled as model driver layer 220 in model I/O stack 204. Hardware layer 112 of client I/O layer 100 is modeled as model hardware layer 222 in model I/O stack 204.

Performance of a client system using client I/O stack 100 often depends on the macroscopic workload characteristics rather than on the microscopic properties. For instance, two workload traces collected in the same environment in one day and then repeated a day later are typically far from being identical. However, the performance of the client system can remain almost the same. This can happen because system performance is typically sensitive to a set to specific macroscopic workload properties (e.g., I/O size distributions, read-write ratios, etc.) and is insensitive to the infinite number of other properties.

The client I/O stack 100 can be generalized as a plurality of layers that are enumerated in a top-to-bottom order, i.e., layer $L_i$ lies below layer $L_i-1$ and above layer $L_i+1$. Incoming workload statistics of the layer $L_i$ can be designated as $I(L_i)$ and outcoming workload statistics of layer L can be designated as $O(L_i)$. In one embodiment, the I/O stack modeling service 202 applies Artificial Intelligence (AI) learning techniques to predict $O(L_i)$ based on $I(L_i)$ for specific configuration of layer $L_i$. By induction, workload characteristics can be predicted at all lower layers $L_i+1$, $L_i+2$, etc. A training system 224 can train an AI model in the form of a training I/O stack 226 using a set of controlled experiments with respect to configuration parameters 228 that may align with the configuration of the client I/O stack 100 or another known system. A variety of systems can be systematically configured with different layers using configuration parameters 228 and stressed with different workloads. Both $O(L_i)$ and $I(L_i)$ can be collected by instrumenting every layer $L_i$ of the training I/O stack 226. Other non-AI prediction methods can be used to predict $O(L_i)$ based on $I(L_i)$.

The training system 224 can select the configuration parameters 228 based on the system configuration parameters 208 or based on learning which parameters impact workload performance. As the configuration parameters are refined layer by layer, the layer configuration parameters (LCPs) are written to each layer of the model I/O stack 204, such as LCP1 in model application layer 212, LCP2 in model middleware layer 214, LCP3 in model file system layer 216, LCP4 in model block layer 218, LCP5 in model driver layer 220, and LCP6 in model hardware layer 222. The trained values of I(Li) from the training I/O stack 226 define input workload characteristics (IWC) for each layer in the model I/O stack 204 and the trained values of O(Li) define output workload characteristics (OWC) for each layer in the model I/O stack 204. For instance, model application layer 212 can include IWC1 and OWC1; model middleware layer 214 can include IWC2 and OWC2; model file system layer 216 can include IWC3 and OWC3; model block layer 218 can include IWC4 and OWC4; model driver layer 220 can include IWC5 and OWC5; and, model hardware layer 222 can include IWC6 and OWC6.

Each of the layers in the model I/O stack 204 can include a model core that defines mappings or relationships between the input workload characteristics and the output workload characteristics based on the layer configuration parameters and, optionally, retained state information during model execution. For example, model application layer 212 can include model core1; model middleware layer 214 can include model core2; model file system layer 216 can include model core3; model block layer 218 can include model core4; model driver layer 220 can include model core5; and, model hardware layer 222 can include model core6.

When the workload characteristics 211 are applied to the uppermost model layer, i.e., model application layer 212, the I/O performance results 230 can be captured as an output from each of the model layer 212-222. Instances of the model I/O stack 204 with associated configuration data can be stored in a model library 232 for future use in problem diagnosis or for comparison to identify optimal configuration parameters to be applied in the client I/O stack 100. To find optimal configurations, a variety of synthesized workloads can be applied to variations of the layer configuration parameters (LCP2-LCP6) in the model I/O stack 204. For instance, different combinations of layer configuration parameter options in one or more model layers 212-222 can be tested, as well as changes to workload characteristics 211. Although only one training system 224 is depicted in FIG. 5, one or more training systems 224 can be employed to train the model I/O stack 204.

Figure 6:
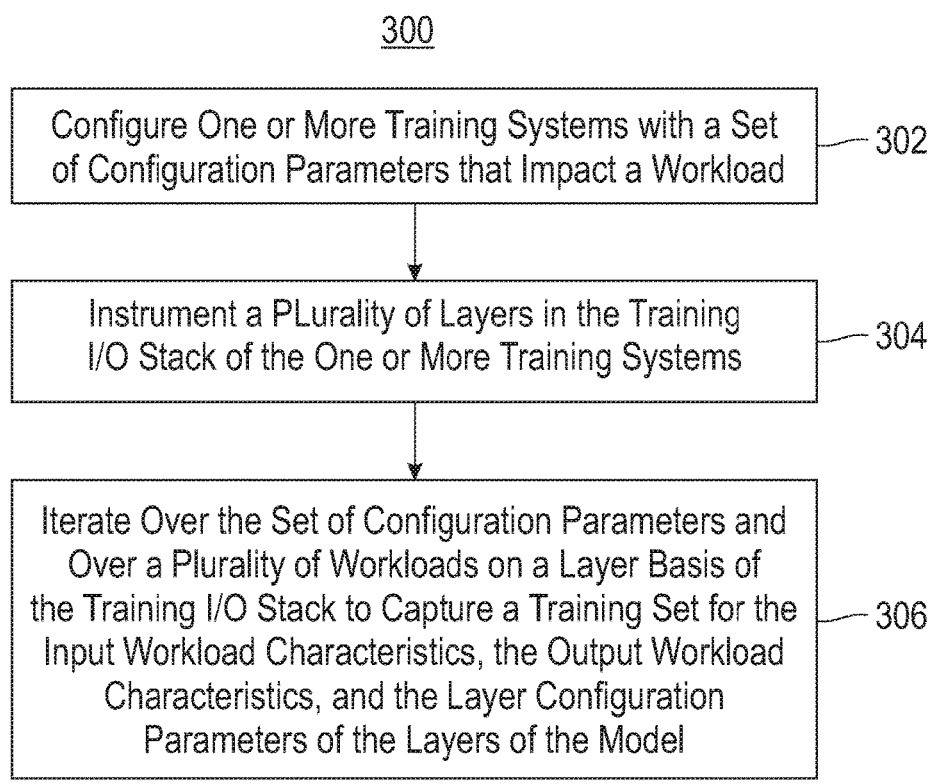
FIG. 6 depicts a process flow for training a model I/O stack according to an embodiment.

FIG. 6 depicts a process flow 300 for training the model I/O stack 204 according to an embodiment. In an embodiment, the processing shown in FIG. 6 is performed by the I/O stack modeling service 202 in conjunction with the training system 224 of FIG. 5 executing on one or more processors. The process flow 300 is further described with respect to FIGS. 1-5. At block 302, one or more training systems 224 are configured with a set of configuration parameters 228 that impact a workload, where the one or more training systems 224 each include a training I/O stack 226 representative of the client I/O stack 100. At block 304, layers in the training I/O stack 226 of the one or more training systems 224 are instrumented. At block 306, iteration over the set of configuration parameters 228 and over a plurality of workloads is performed on a layer basis of the training I/O stack 226 to capture a training set for the input workload characteristics (IWC1-IWC6), the output workload characteristics (OWC1-OWC6), and the layer configuration parameters (LCP1-LCP6) of the model layers 212-222 of model I/O stack 204.

Figure 7:
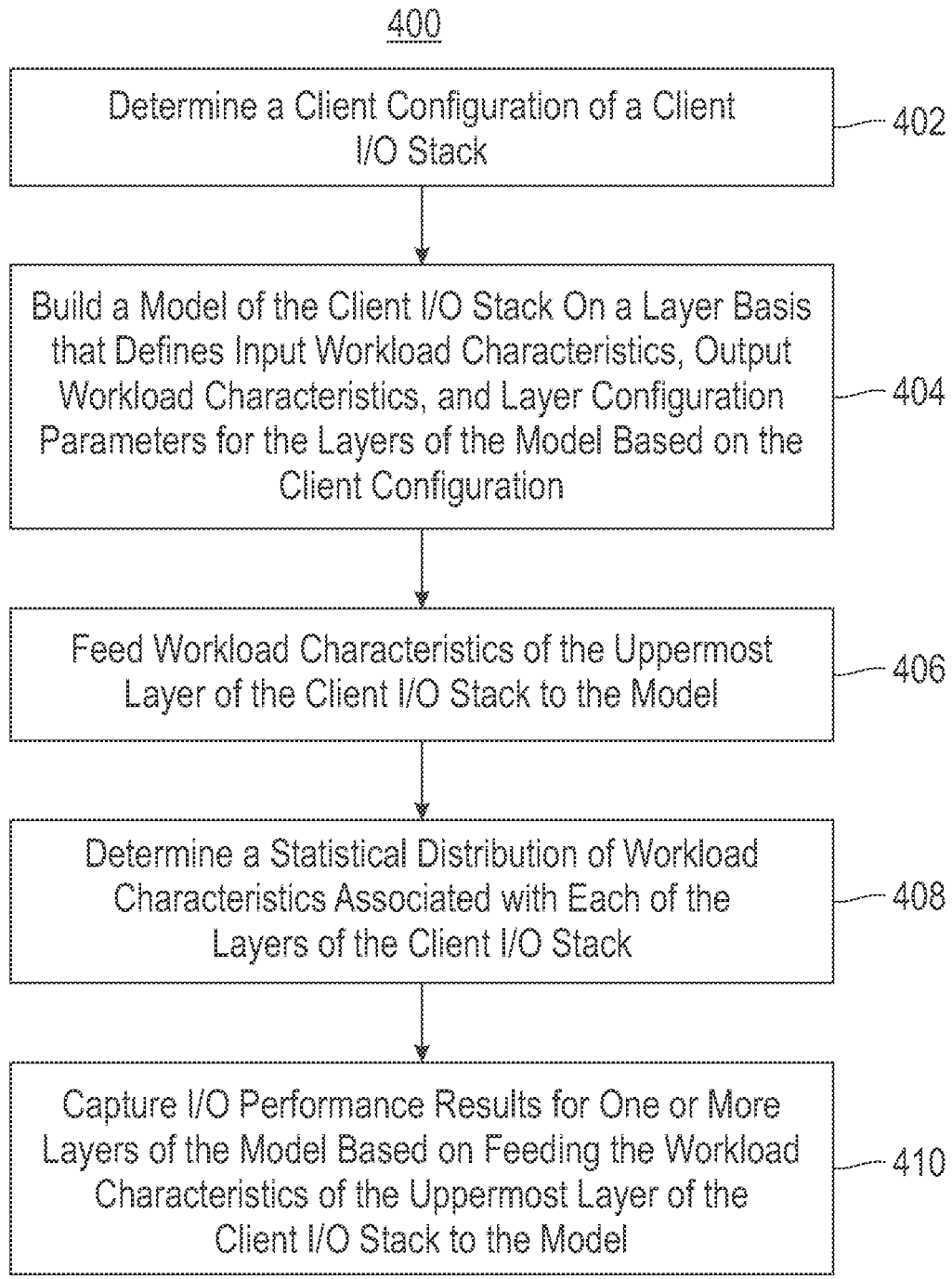
FIG. 7 depicts a process flow for I/O stack modeling according to an embodiment.

Referring to FIG. 7, a process flow 400 for I/O stack modeling is generally shown in accordance with an embodiment. In an embodiment, the processing shown in FIG. 7 is performed by the I/O stack modeling service 202 of FIG. 5 executing on one or more processors. The process flow 400 is further described with respect to FIGS. 1-6 and can be performed iteratively as an extension of process flow 300 of FIG. 6. At block 402, a client configuration 116 is determined of a client I/O stack 100 that includes a plurality of layers 102-112 with configurable parameters to control storage and retrieval of data between an uppermost layer (e.g., an application layer 102) and a lowest layer (e.g., a hardware layer 112). The client configuration 116 can be determined based on performing one or more of: accessing a set of configuration files of the client I/O stack 100 and issuing one or more function calls to configuration exporting functions of the client I/O stack 100.

At block 404, a model client I/O stack 204 is built on a layer basis that defines input workload characteristics (e.g., IWC1-IWC6), output workload characteristics (e.g., OWC1-OWC6), and layer configuration parameters (e.g., LCP1-LCP6) for model layers 212-222 based on the client configuration 116.

At block 406, workload characteristics 211 of the uppermost layer (i.e., the application layer 102) of the client I/O stack 100 are fed to the model I/O stack 204. The workload characteristics 211 of the uppermost layer of the client I/O stack 100 can be determined based on collecting macroscopic workload properties of I/O activity at the uppermost layer over an observation period of time.

At block 408, a statistical distribution of workload characteristics associated with each of the layers 102-112 of the client I/O stack 100 is determined.

At block 410, I/O performance results 230 for one or more model layers 212-222 are captured based on feeding the workload characteristics 211 of the uppermost layer of the client I/O stack 100 to the model I/O stack 204.

Data representing the client configuration 116 and the model I/O stack 204 can be stored in the model library 232. Updates of the model I/O stack 204 can be determined based on updates to the client configuration 116.

With reference to FIGS. 1-7, the set of configuration parameters 228 that impact a workload can be determined by starting with all available configuration parameters 228, observing which of the configuration parameters 228 impact workload characteristics 211, and removing the configuration parameters 228 from the set that do not impact workload characteristics 211. The training set may define a mapping between distributions at different layers and the mapping is used to produce distributions at lower layers to build the model, e.g., define model core1-model core6 as mapped distributions. As an alternative, the training set can build weighted connections between input workload characteristics and the output workload characteristics of the layers in the model and the weighted connections are used to predict the I/O performance results on a layer basis in model core1-model core6. As a further alternative, model core1-model core6 can be built based on a code analysis of the client I/O stack 100, e.g., where source code is available or instrumented to reveal actual performance responses to input.

Technical effects and benefits include building, training and using an I/O stack model for problem diagnosis and optimization of a client I/O stack.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for input/output (I/O) stack modeling, the method comprising:
determining, by a processor, a client configuration of a client I/O stack comprising a plurality of layers with configurable parameters to control storage and retrieval of data between an uppermost layer and a lowest layer of an existing client storage system;
building a model of the client I/O stack on a layer basis that defines input workload characteristics, output workload characteristics, and layer configuration parameters for the layers of the model based on the client configuration;
configuring one or more training systems with a set of configuration parameters that impact a workload, the one or more training systems each comprising a training I/O stack representative of the client I/O stack;
instrumenting a plurality of layers in the training I/O stack of the one or more training systems;

iterating over the set of configuration parameters on a layer basis of the training I/O stack to capture a training set;

updating the input workload characteristics, the output workload characteristics, and the layer configuration parameters of the layers of the model based on the training set, wherein the training set defines a mapping between distributions at different layers and wherein the mapping is used to produce distributions at lower layers to build the model;

feeding a plurality of workload characteristics of the uppermost layer of the client I/O stack to the model;

determining, by the processor, a statistical distribution of workload characteristics associated with each of the layers of the client I/O stack;

capturing I/O performance results for one or more layers of the model based on feeding the workload characteristics of the uppermost layer of the client I/O stack to the model; and diagnosing a problem with the client I/O stack of the existing client storage system based on the I/O performance results for one or more layers of the model.

2. The method of claim 1, further comprising storing data representing the client configuration and the model in a model library.

3. The method of claim 1, wherein the set of configuration parameters that impact a workload is determined by starting with all available configuration parameters, observing which of the configuration parameters impact workload characteristics, and removing the configuration parameters from the set that do not impact workload characteristics.

4. The method of claim 1, wherein the training set builds weighted connections between input workload characteristics and the output workload characteristics of the layers in the model and wherein the weighted connections are used to predict the I/O performance results on a layer basis.

5. The method of claim 1, wherein the model is built based on a code analysis of the client I/O stack.

6. The method of claim 1, wherein the I/O stack modeling is implemented as a service in a cloud computing environment.

7. The method of claim 1, further comprising updating the model based on updates to the client configuration.

8. The method of claim 1, wherein the workload characteristics of the uppermost layer of the client I/O stack are determined based on collecting macroscopic workload properties of I/O activity at the uppermost layer over an observation period of time.

9. A system for input/output (I/O) stack modeling, the system comprising:
a memory having computer readable instructions; and
a processor for executing the computer readable instructions, the computer readable instructions comprising:
determining, by the processor, a client configuration of a client I/O stack comprising a plurality of layers with configurable parameters to control storage and retrieval of data between an uppermost layer and a lowest layer of an existing client storage system;
building a model of the client I/O stack on a layer basis that defines input workload characteristics, output workload characteristics, and layer configuration parameters for the layers of the model based on the client configuration;
configuring one or more training systems with a set of configuration parameters that impact a workload, the one or more training systems each comprising a training I/O stack representative of the client I/O stack;
instrumenting a plurality of layers in the training I/O stack of the one or more training systems;
iterating over the set of configuration parameters on a layer basis of the training I/O stack to capture a training set;
updating the input workload characteristics, the output workload characteristics, and the layer configuration parameters of the layers of the model based on the training set, wherein the training set defines a mapping between distributions at different layers and wherein the mapping is used to produce distributions at lower layers to build the model;
feeding a plurality of workload characteristics of the uppermost layer of the client I/O stack to the model;
determining, by the processor, a statistical distribution of workload characteristics associated with each of the layers of the client I/O stack;
capturing I/O performance results for one or more layers of the model based on feeding the workload characteristics of the uppermost layer of the client I/O stack to the model; and
diagnosing a problem with the client I/O stack of the existing client storage system based on the I/O performance results for one or more layers of the model.

10. The system of claim 9, wherein the set of configuration parameters that impact a workload is determined by starting with all available configuration parameters, observing which of the configuration parameters impact workload characteristics, and removing the configuration parameters from the set that do not impact workload characteristics.

11. The system of claim 9, wherein the training set builds weighted connections between input workload characteristics and the output workload characteristics of the layers in the model and wherein the weighted connections are used to predict the I/O performance results on a layer basis.

12. The system of claim 9, wherein the model is built based on a code analysis of the client I/O stack.

13. The system of claim 9, wherein the I/O stack modeling is implemented as a service in a cloud computing environment.

14. The system of claim 9, wherein the workload characteristics of the uppermost layer of the client I/O stack are determined based on collecting macroscopic workload properties of I/O activity at the uppermost layer over an observation period of time.

15. A computer program product for input/output (I/O) stack modeling, the computer program product comprising a computer readable storage medium having program instructions embodied therewith, the program instructions executable by a processor to cause the processor to:
determine a client configuration of a client I/O stack comprising a plurality of layers with configurable parameters to control storage and retrieval of data between an uppermost layer and a lowest layer of an existing client storage system;
build a model of the client I/O stack on a layer basis that defines input workload characteristics, output workload characteristics, and layer configuration parameters for the layers of the model based on the client configuration;
configure one or more training systems with a set of configuration parameters that impact a workload, the one or more training systems each comprising a training I/O stack representative of the client I/O stack;
instrument a plurality of layers in the training I/O stack of the one or more training systems;
iterate over the set of configuration parameters on a layer basis of the training I/O stack to capture a training set;
update the input workload characteristics, the output workload characteristics, and the layer configuration parameters of the layers of the model based on the training set, wherein the training set defines a mapping between distributions at different layers and wherein the mapping is used to produce distributions at lower layers to build the model;
feed a plurality of workload characteristics of the uppermost layer of the client I/O stack to the model;
determine a statistical distribution of workload characteristics associated with each of the layers of the client I/O stack;
capture I/O performance results for one or more layers of the model based on feeding the workload characteristics of the uppermost layer of the client I/O stack to the model; and
diagnose a problem with the client I/O stack of the existing client storage system based on the I/O performance results for one or more layers of the model.

* * * * *